Patented Apr. 10, 1945

2,373,177

UNITED STATES PATENT OFFICE 2,373,177

WRINKLE FINISH DRYING COMPOSITIONS

Folsom E. Drummond and William A. Waldie, Dayton, Ohio, assignors to New Wrinkle, Inc., Dayton, Ohio, a corporation of Delaware No Drawing. Application October 26, 1939, Serial No. 301,511

2 Claims. (Cl. 106—221)

This invention relates to wrinkle finish compositions, and more particularly to a vehicle for use in compounding wrinkling varnishes and enamels.

Heretofore in the manufacture of wrinkle finishes of the oil varnish type, they have invariably contained substantial quantities of China-wood oil, oiticica, or equivalent wrinkling drying oil. These oils have been utilized either in the blown or unblown or partially oxidized state with small additions of other drying oils such as linseed, perilla, and the like.

It is an object of this invention to produce a wrinkle finish composition wherein substantial amounts of the China-wood oil are replaced with dehydrated castor oil so as to produce a wrinkle drying composition which is comparable with China-wood oil wrinkle finishes.

Another object is to compound a wrinkle finish vehicle which may be compounded with pigment to provide a suitable wrinkle drying enamel.

Another object is to provide a wrinkling varnish composition wherein dehydrated castor oil is substituted for a portion of the China-wood oil so as to produce a more rapid drying and harder wrinkle finish composition.

These and other objects will be apparent from the following description.

As a typical example of the formulation and procedure for utilizing this invention, the following illustrative examples are given:

Varnish A

| | | |
|---|---|---|
| Amberol | pounds | 100 |
| Lead acetate | do | 5 to 10 |
| Raw tung oil | gallons | 16 to 25 |
| Linseed oil | do | 1 to 5 |
| Thinner such as toluol or petroleum naphtha or a mixture of the two | do | 25 to 35 |

Varnish B

| | | |
|---|---|---|
| Amberol | pounds | 100 |
| Lead acetate | do | 5 to 10 |
| Raw tung oil | gallons | 7 to 10 |
| Dehydrated castor oil | do | 7 to 10 |
| Linseed oil | do | 1 to 3 |
| Toluol or petroleum naphtha or a mixture of the two | do | 25 to 35 |

In manufacturing Varnish A, the tung oil and about half the amberol are heated in a kettle to approximately 500 to 550 degrees F. until the tung oil is about to congeal. Thereafter the lead acetate, linseed oil and the remaining portion of the amberol are added to the batch and thoroughly stirred. After the resin and acetate have dissolved, the batch is allowed to cool to about 400 degrees F. and the thinner added.

Varnish B is made in like manner as Varnish A. In place of amberol other phenol formaldehyde synthetic resins or similar oil-soluble resins may be used. To the above varnishes there is added a liquid drier. This drier has the following typical formula:

| | | |
|---|---|---|
| Solid cobalt linoleate | pounds | 16 to 20 |
| Wood oil fatty acids | do | 7 to 10 |
| Toluol | gallons | 7 to 10 |

The above linoleate and wood oil fatty acid ingredients are melted together and the toluol thoroughly incorporated to provide a liquid drier composition.

In formulating the wrinkle finish, about 3 to 5 per cent of the liquid drier is incorporated with Varnish A and Varnish B. The final wrinkle finish composition is comprised as follows:

| | Per cent by volume |
|---|---|
| Varnish A | 50 |
| Varnish B | 50 |

The resultant product is applied to the surface to be coated by spraying or flowing and will air dry to a tough wrinkle film in 12 to 15 hours. Different proportionate blends of Varnishes A and B can be made to vary the drying and film forming properties of the product.

The dehydrated castor oil ingredient utilized in making Varnish B may be made by heat treating castor oil at from 480 to 525 degrees F. for about 2½ hours. This produces a castor oil product which is compatible with the conventional paint oil hydrocarbon solvents, and when incorporated with oxidation accelerators, dries to a tough film within a few hours. Suitable dehydrating agents may be added during treatment of the castor oil, such as alkali metal hydroxides, sulphur, halogen compounds and the like.

As a modification the dehydrated castor oil may be prepared by heating the oil to effect dehydration and esterifying the residue by adding glycerine. The esterified composition is condensed with phthalic anhydride to form a drying oil product in which the fatty acid glycerides possess a polyconjugated double bond structural linkage.

By way of a specific example the castor oil product may be made as follows:

One hundred pounds of castor oil is heated to approximately 500 degrees F. and destructively distilled until the residue comprises about 70 per cent of the original mass. The residue is cooled to around 400 degrees F. and 75 pounds of glycerine added to esterify the mixture. The esterified product is maintained at about 400 degrees F. for a period of time sufficient to remove any water present, and then 112 pounds of phthalic anhydride is stirred into the mixture and the temperature held at about 425 degrees F. until the reaction has taken place producing a clear homogeneous product. Thereafter the reaction product is cooled to 300 degrees F. and solvent thinner, such as toluol, added in amount to produce an oil product of the desired viscosity or body. It will of course be appreciated that other polyhydric alcohols may be substituted for glycerine and other polycarboxylic acids used in place of phthalic anhydride to modify the properties of the final product.

A portion of the vegetable drying oils utilized in compounding the varnishes may be mixed with the castor oil prior to destructively distilling, esterifying and condensing to vary the film drying and hardening properties of the final product.

By modifying the drier, a drying oil varnish may be made wherein all of the tung oil is replaced with dehydrated castor oil. The following is a typical formulation for this type of product:

Varnish C

| | | |
|---|---|---|
| Amberol | pounds | 100 |
| Lead acetate | do | 7 |
| Dehydrated castor oil | gallons | 15 |
| Linseed oil | do | 5 |
| Toluol | do | 35 |

Varnish C is made by combining the resin, lead acetate and oil together under heat by maintaining the mixture at about 550 degrees F. for sufficient time to provide an oleoresinous mixture of the desired viscosity. After the batch has cooled to approximately 350 degrees F. the toluol is added.

The liquid drier used in this instance comprises:

| | | |
|---|---|---|
| Cobalt linoleate | pounds | 15 |
| Wood oil fatty acids | do | 10 |
| Benzoyl peroxide | do | 1 |
| Toluol | gallons | 10 |

Sufficient amount of this liquid drier is incorporated with Varnish C to produce an air drying wrinkle finish. The varnish may be thinned with toluol, xylol or petroleum naphtha to provide a suitable composition for spraying.

It will be understood that each of the above varnishes may be employed in compounding wrinkling enamels by incorporating a proper amount of pigment ground in the varnish vehicle. Further, various wrinkle finish texture modifying ingredients may be incorporated, such as asbestine, fatty acids, solvent thinners, etc. Different resins may be utilized in making the varnish compositions such as oil modified phenol aldehyde synthetic resins, alkyd resins, rosin, ester gum and fossil resins. Other wrinkling oils, such as oiticica and blown drying oils may be used in place of tung oil in compounding the varnishes herein. Perilla or equivalent drying oils may be substituted for linseed. If desired the drying oils are blown or in partially oxidized state.

The above compositions are adapted to air dry to a wrinkle finish but may be baked or dried at 100 to 150 degrees F. to produce a wrinkle finish. Use may be made of infra red radiation for instigating the wrinkling of the film.

It will be understood that the above formulations are merely exemplary of this invention and that various modifications and changes may be made without departing from the spirit of this invention.

Having thus fully described our invention, what we claim as new and desire to secure by Letters Patent is:

1. A method of making a wrinkle finish coating composition comprising the steps of mixing resin, wrinkling drying oil other than dehydrated castor oil and metallic drier together to form an oleoresinous wrinkling varnish and blending therewith a second wrinkling oleoresinous varnish containing a mixture of wrinkling drying oils including dehydrated castor oil the two varnishes being blended in substantially equal proportions by volume to form a composition which when applied as a film will dry to a wrinkle finish.

2. A method of making a wrinkle finish composition comprising the steps of mixing resin, wrinkling drying oil other than dehydrated castor oil and metallic dryer together to form an oleoresinous wrinkling varnish and blending therewith a scecond oleoresinous varnish containing a mixture of wrinkling drying oils including dehydrated castor oil, which has been destructively distilled at a temperature of about 480° F. to 525° F., the two varnishes being blended in substantially equal proportions by volume to form a composition which when applied as a film will dry to a wrinkle finish.

FOLSOM E. DRUMMOND.
WILLIAM A. WALDIE.